(12) United States Patent
Cuddy et al.

(10) Patent No.: US 9,109,615 B2
(45) Date of Patent: Aug. 18, 2015

(54) APPARATUS AND METHOD FOR ASSOCIATING THE EDGE OF A COMPOSITE OBJECT WITH ANOTHER OBJECT

(71) Applicant: The Boeing Company, Chicago, IL (US)

(72) Inventors: Nathanial C. Cuddy, Snohomish, WA (US); Paul Thomas Bridgeman, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 113 days.

(21) Appl. No.: 13/747,641

(22) Filed: Jan. 23, 2013

(65) Prior Publication Data

US 2014/0202615 A1 Jul. 24, 2014

(51) Int. Cl.
*F16B 17/00* (2006.01)
*F16B 5/01* (2006.01)
*F16B 37/12* (2006.01)

(52) U.S. Cl.
CPC ............... *F16B 5/01* (2013.01); *F16B 37/122* (2013.01); *Y10T 29/49947* (2015.01); *Y10T 403/47* (2015.01); *Y10T 403/64* (2015.01); *Y10T 403/70* (2015.01)

(58) Field of Classification Search
CPC .................................. B32B 37/12; F16B 5/01
USPC ..................... 156/66, 349; 403/345
See application file for complete search history.

(56) References Cited

U.S. PATENT DOCUMENTS

| 3,742,673 | A | * | 7/1973 | Jennings et al. ........... 52/787.12 |
| 4,916,882 | A | * | 4/1990 | Brochard et al. ............. 403/241 |
| 5,324,146 | A |   | 6/1994 | Parenti et al. |
| 5,632,582 | A | * | 5/1997 | Gauron ....................... 411/82.1 |
| 5,713,706 | A |   | 2/1998 | Lozano |
| 7,195,436 | B1 | * | 3/2007 | Stephen ....................... 411/82.1 |
| 2009/0293421 | A1 |   | 12/2009 | Erickson et al. |
| 2011/0296788 | A1 | * | 12/2011 | Cove et al. ..................... 52/704 |
| 2014/0205368 | A1 |   | 7/2014 | Kramer et al. |

FOREIGN PATENT DOCUMENTS

| DE | 102005057525 B3 | 6/2007 |
| EP | 0359602 A1 | 3/1990 |

OTHER PUBLICATIONS

Cuddy et al., "Apparatus and Method for Associating the Edge of a Composite Object With Trim," U.S. Appl. No. 13/906,632, filed May 31, 2013, 68 pages.
"For Honeycomb and Sandwich Panels," Alcoa Fastening Systems, copyright 1994, 74 pages, accessed Dec. 7, 2012 http://www.alcoa.com/fastening_systems/aerospace/catalog/pdf/AFS_Delron_honeycomb_sandwich_panels_08_2011.pdf.

(Continued)

*Primary Examiner* — Philip Tucker
*Assistant Examiner* — John Blades
(74) *Attorney, Agent, or Firm* — Yee & Associates, P.C.

(57) ABSTRACT

A method and apparatus for associating an edge of a first object with a second object. An insert comprising a structure holding a fastener element may be positioned within a hollow portion at the edge of the first object. The structure may be configured to span an entire thickness of the first object at the edge of the first object. The structure may be adhesively bonded to the first object. The second object may be attached to the edge of the first object using the fastener element.

19 Claims, 12 Drawing Sheets

(56) References Cited

OTHER PUBLICATIONS

"Potted Composite Inserts," Marketing Masters, copyright 2011, 1 page, accessed Dec. 7, 2012 http://www.clipnuts.com/potted_in_inserts.html.

"Shur-Lok Design Manual Fasteners for Sandwich Structure," Shur-Lok Corporation, copyright 1996, 35 pages, accessed Dec. 7, 2012 http://www.shur-lok.com/product_dls/Design_Manual.pdf.

International Search Report and Written Opinion, dated Apr. 28, 2014, regarding Application No. PCT/US2013/076793, 12 pages.

Office Action, dated Sep. 18, 2014, regarding U.S. Appl. No. 13/906,632, 14 pages.

Final Office Action, dated Feb. 26, 2015, regarding U.S. Appl. No. 13/906,632, 16 pages.

* cited by examiner

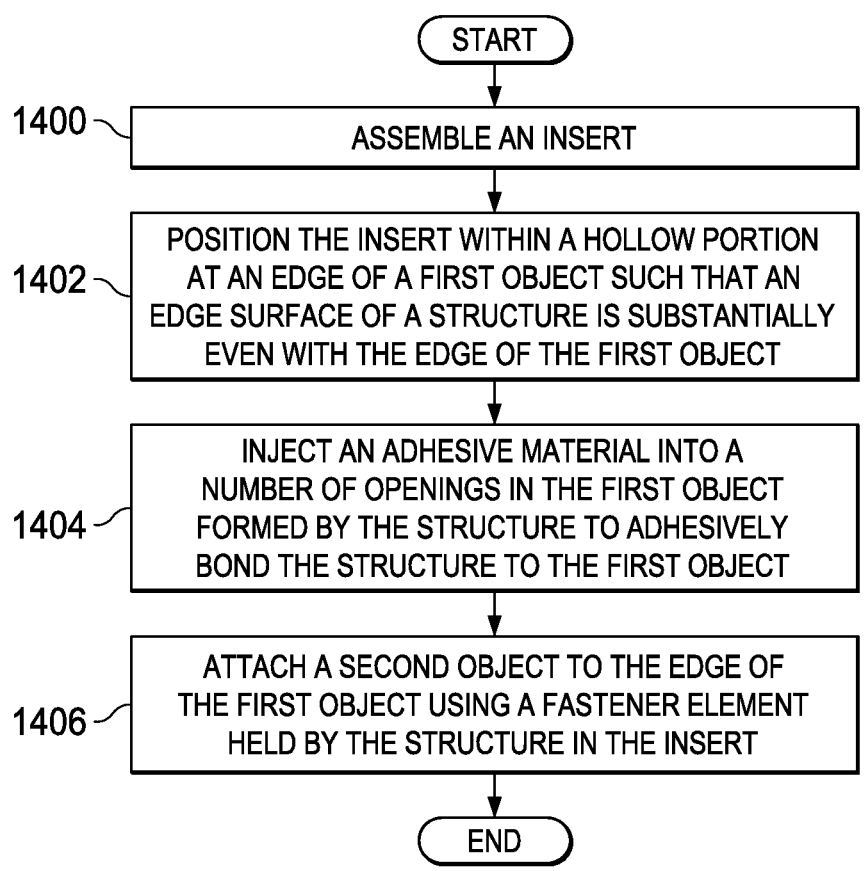

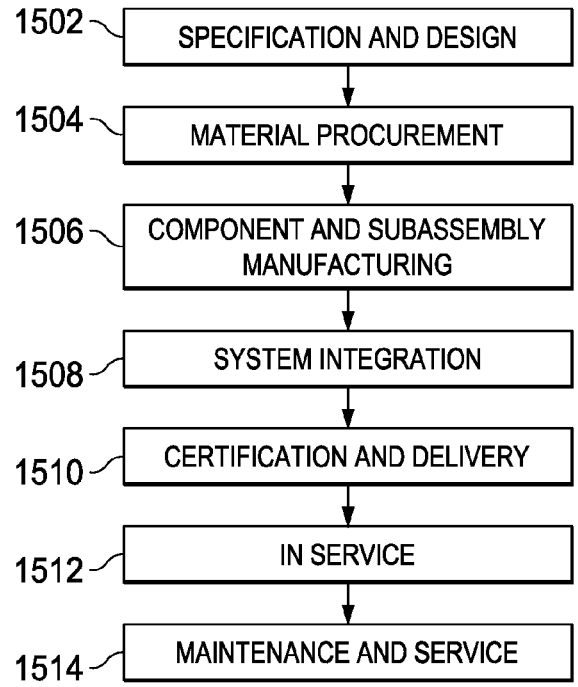
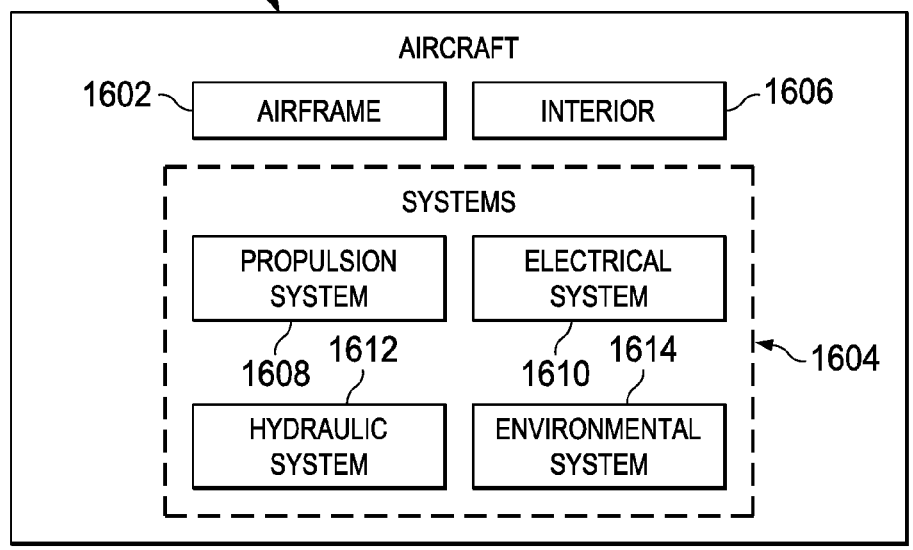

APPARATUS AND METHOD FOR ASSOCIATING THE EDGE OF A COMPOSITE OBJECT WITH ANOTHER OBJECT

BACKGROUND INFORMATION

1. Field

The present disclosure relates generally to associating objects with each other. More particularly, the present disclosure relates to a method and apparatus for associating the edge of an object with another object using an insert that may be adhesively bonded to the object at the edge of the object.

2. Background

A composite object may be considered a sandwiched composite object when the composite object is comprised of a core layer of material that is sandwiched between a first layer of material and a second layer of material. The core layer of material may have a greater thickness than the first and second layers of material. In some cases, the core layer of material may be comprised of a honeycomb material, a foam material, or some other structure. A honeycomb material may be a material that has a honeycomb-like structure.

Oftentimes, all three of these layers may be exposed at the edge of a composite object. Attaching another object to the composite object at the edge of the composite object may require using one or more fastener components that have been installed at the edge of the composite object.

As one illustrative example, a bracket may be installed at the edge of the composite object. The bracket may surround a portion of the edge of the composite object and cover a portion of the outer surface of the first layer of material and a portion of the outer surface of the second layer of material. Consequently, in some cases, a bracket may change the shape of the outer surfaces of the composite object in an undesired manner. For example, without limitation, a bracket may change the evenness of these outer surfaces.

In another illustrative example, a fastener may be installed at the edge of the composite object using a cylindrical insert. For example, without limitation, a hole may be formed within the core layer of material at the edge of the composite object. The cylindrical insert may then be placed within this hole in the core layer of material. The fastener may then be installed within the cylindrical insert.

However, in some cases, the hole formed within the core layer of material may be rougher than desired. For example, without limitation, the edges of the hole may be uneven and rougher than desired. As a result, the cylindrical insert may not align with the hole in the core layer of material within selected tolerances. This type of misalignment may require additional processing of the hole, which may in turn, increase the overall time and/or effort needed to install the fastener. Further, in some cases, the cylindrical insert may increase the overall weight of the composite object more than desired.

Additionally, forming a hole within the core layer of material may have an undesirable effect on the structural integrity of the core layer of material. For example, without limitation, forming a hole within a honeycomb material may reduce the structural strength of the honeycomb material. Therefore, it would be desirable to have a method and apparatus that take into account at least some of the issues discussed above, as well as other possible issues.

SUMMARY

In one illustrative embodiment, an apparatus may comprise a fastener element and a structure. The structure may be configured to hold the fastener element such that the fastener element is exposed at an edge of an object when the structure is inserted within a hollow portion at an edge of an object. The structure may be configured to span an entire thickness of the object at the edge of the object.

In another illustrative embodiment, an insert configured for use at an edge of an object may comprise a fastener element, a structure, and a cover. The structure may be configured to be inserted within a hollow portion at the edge of the structure. The structure may be configured to span an entire thickness of the object at the edge of the object. The structure may comprise a hollow fastener chamber, a set of hollow chambers, an edge surface, a first surface, a second surface, and a number of grooves. The hollow fastener chamber may be configured to receive and hold the fastener element such that the fastener element is exposed at the edge of the object when the structure is inserted into the hollow portion of the object. The hollow fastener chamber may have a first size that is greater than a second size of the fastener element such that the fastener element may move freely within the hollow fastener chamber of the structure within a plane substantially perpendicular to an axis through the fastener element. The set of hollow chambers may be configured to reduce a weight of the structure. The edge surface may be configured to be substantially even with the edge of the structure when the structure is inserted into the hollow portion of the structure. The first surface may be configured to be substantially even with a first outer surface of the object and the second surface may be configured to be substantially even with a second outer surface of the object. The number of grooves may be configured to form a number of openings in the structure when the structure is inserted into the hollow portion of the structure. An adhesive material may be configured to be injected into the number of openings to adhesively bond the structure to the structure. The cover may be configured to cover the fastener element and the hollow fastener chamber of the structure.

In yet another illustrative embodiment, a method for associating an edge of a first object with a second object may be provided. An insert comprising a structure holding a fastener element may be positioned within a hollow portion at the edge of the first object such that the fastener element is exposed at the edge of the object. The structure may be configured to span an entire thickness of the first object at the edge of the first object. The structure may be adhesively bonded to the first object. The second object may be attached to the edge of the first object using the fastener element.

In still yet another illustrative embodiment, a method for associating an edge of a first object with a second object may be provided. An insert may be assembled by positioning a fastener element within a hollow fastener chamber of a structure and covering the fastener element and the hollow fastener chamber using a cover. The insert may be positioned within a hollow portion at the edge of the first object such that an edge surface of the structure is substantially even with the edge of the first object and such that the fastener element is exposed at the edge of the object. The structure may be configured to span an entire thickness of the first object at the edge of the first object. The structure may have a number of grooves configured to form a number of openings in the first object when the structure may be inserted into the hollow portion of the first object. An adhesive material may be injected into the number of openings in the first object to adhesively bond the structure to the first object. A second object may be attached to the edge of the first object using a corresponding fastener element configured for association with the second object within a channel extending through the fastener element held by the structure in the insert.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a process for associating an edge of a first object with a second object in the form of a flowchart in accordance with an illustrative embodiment;

FIG. 15 is an illustration of an aircraft manufacturing and service method in the form of a block diagram in accordance with an illustrative embodiment; and FIG. 16 is an illustration of an aircraft in the form of a block diagram in accordance with an illustrative embodiment.

DETAILED DESCRIPTION

The different illustrative embodiments recognize and take into account different considerations. In particular, the illustrative embodiments recognize and take into account that it may be desirable to have an insert that may be installed at the edge of a composite object without reducing the structural integrity of the composite object more than desired. Further, the illustrative embodiments recognize and take into account that it may be desirable to have an insert that may be installed at the edge of a composite object without taking more time and/or effort than desired.

Thus, the illustrative embodiments provide a method and apparatus for associating an edge of a first object with a second object. In one illustrative embodiment, a method and apparatus for associating an edge of a first object with a second object may be provided. An insert comprising a structure holding a fastener element may be positioned within a hollow portion at the edge of the first object. The structure may be configured to span an entire thickness of the first object at the edge of the first object. The structure may be adhesively bonded to the first object. The second object may be attached to the edge of the first object using the fastener element.

Figure 1:
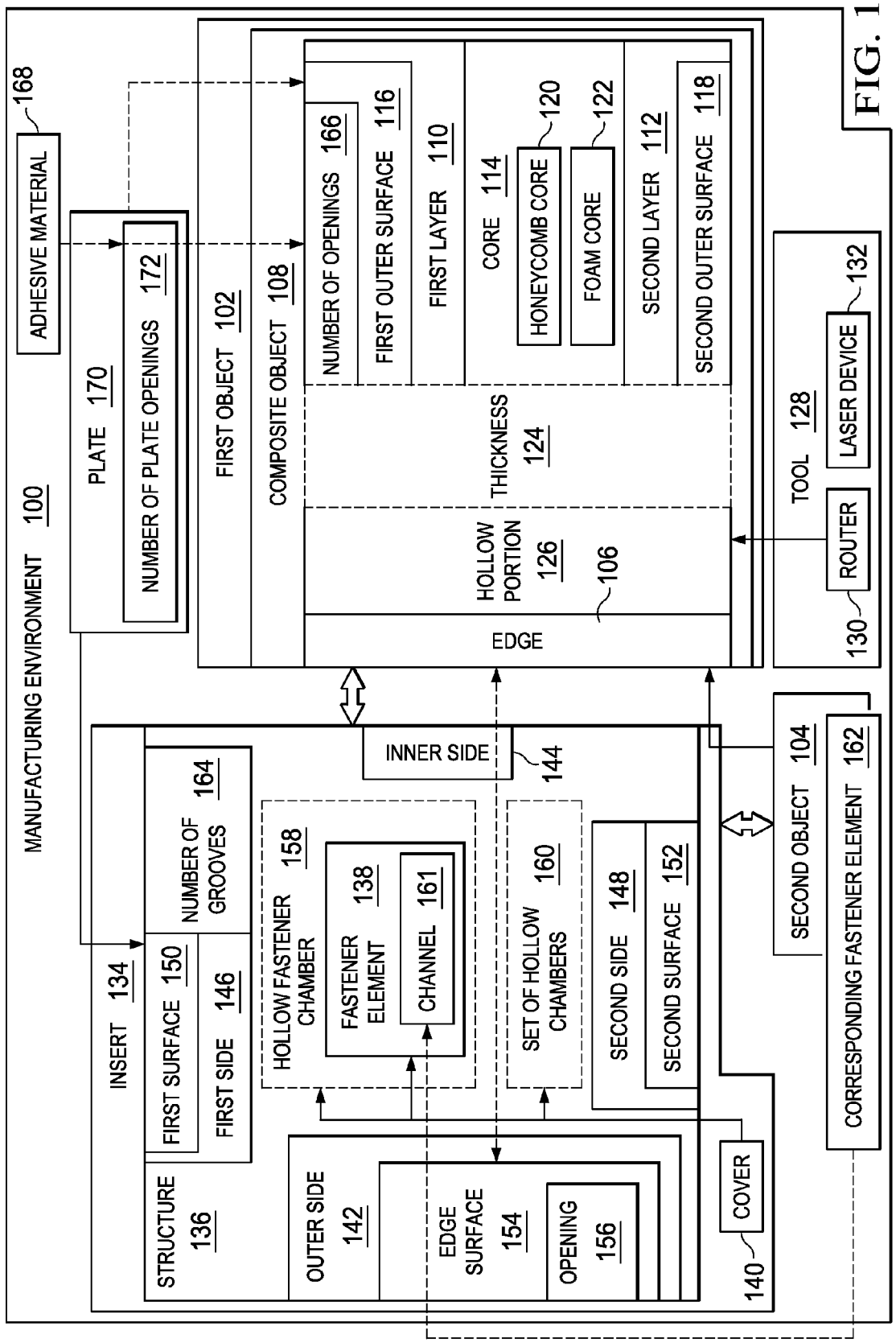
FIG. 1 is an illustration of a manufacturing environment in the form of a block diagram in accordance with an illustrative embodiment.

Referring now to the figures and, in particular, with reference now to FIG. 1, an illustration of a manufacturing environment in the form of a block diagram is depicted in accordance with an illustrative embodiment. In FIG. 1, manufacturing environment 100 may be an example of an environment in which structures may be associated with each other. In these illustrative examples, first object 102 and second object 104 may be configured for association with each other within manufacturing environment 100.

A component, such as second object 104, may be considered to be associated with another component, such as first object 102, by being secured, attached, bonded, fastened, and/or mounted to the other component. Additionally, a component may be associated with another component by being connected to the other component in some other suitable manner. In some cases, a component also may be connected to another component by using yet another component. In other illustrative examples, a component may be considered to be associated with another component by being formed as part of and/or as an extension of the other component.

In these illustrative examples, first object 102 may take the form of composite object 108. In particular, first object 102 may be comprised of first layer 110, second layer 112, and core 114. In these illustrative examples, core 114 may be located in between first layer 110 and second layer 112. In other words, core 114 may be "sandwiched" between first layer 110 and second layer 112. In this manner, first object 102 may be referred to as a "sandwiched composite object" or a "sandwiched-structure composite."

The surface of first layer 110 not in contact with core 114 may form first outer surface 116 of first object 102. Further, the surface of second layer 112 not in contact with core 114 may form second outer surface 118 of first object 102.

First layer 110 and second layer 112 of first object 102 may be comprised of any number of different materials. These materials may include, for example, without limitation, a composite material, metal, plastic, and/or other suitable types of materials. In some cases, these layers may be comprised of one or more composite materials including, but not limited to, glass-reinforced plastic, carbon fiber-reinforced plastic (CFRP), thermoplastic, a thermoset polymer, a composite polymer, and/or other types of composite materials.

In one illustrative example, first layer 110 and second layer 112 may take the form of pre-impregnated composite fiber panels, also referred to as prepreg panels or prepregs. In some cases, first layer 110 and second layer 112 may be referred to as face sheets or skins.

Depending on the implementation, core 114 may take the form of honeycomb core 120 or foam core 122. Honeycomb core 120 may be a layer of material comprising an array of hollow cells defined by walls. These cells may have, for example, without limitation, a cylindrical shape, a cuboidal shape, a prism-type shape, a hexagonal shape, or some other type of shape. Foam core 122 may be, for example, without limitation, a layer of material comprised of, for example, without limitation, an open-cell foam material, a closed-cell foam material, or some other type of foam material.

Of course, in other illustrative examples, core 114 may take a different form. For example, without limitation, core 114 may take the form of a lattice structure, an arrangement of rods, and/or other types of elongate members, a mesh structure, or some other type of structure.

Further, core 114 of first object 102 may be comprised of any number of different materials. In particular, core 114 may be a light-weight structure comprised of any selection of materials configured to allow core 114 to hold first layer 110 and second layer 112 a fixed distance apart during locating. The selection of materials may include, for example, without limitation, polyurethane, aluminum, glass-reinforced plastic such as fiberglass, carbon fiber-reinforced plastic, a thermoplastic material, an aramid fiber material, a meta-aramid material, a foam material, and/or other types of materials.

Second object 104 may take a number of different forms. Second object 104 may be any type of object that is configured for association with edge 106 of first object 102. For example, without limitation, second object 104 may take the form of a trim, an edge-mount step, a handhold, a quarter turn object, a hinge, a wire tie, a bracket, a trim material, or some other type of object configured to be attached to edge 106 of first object 102.

As depicted, edge 106 of first object 102 may span the entire thickness 124 of first object 102. When first object 102 takes the form of composite object 108, edge 106 may be any edge at which each of first layer 110, second layer 112, and core 114 are exposed. In particular, edge 106 may span the entire thickness 124 that includes the thicknesses of each of first layer 110, second layer 112, and core 114 that may be exposed.

Further, edge 106 of first object 102 may be substantially perpendicular to first outer surface 116 of first object 102 and substantially perpendicular to second outer surface 118 of first object 102 in these illustrative examples. Of course, in some cases, edge 106 may be at some other angle relative to first outer surface 116 and/or second outer surface 118. However, in these illustrative examples, edge 106 may not be substantially parallel to first outer surface 116 or second outer surface 118.

Second object 104 may be associated with first object 102 using insert 134. Insert 134 may be configured to be positioned within hollow portion 126 of first object 102 at edge 106. In these illustrative examples, hollow portion 126 may be formed within first object 102 at edge 106 of first object 102 using tool 128. In particular, tool 128 may be used to remove a portion of first object 102 to form hollow portion 126. Hollow portion 126 may be formed such that hollow portion 126 spans the entire thickness 124 of first object 102 at edge 106 of first object 102. In other words, the portion removed from first object 102 may include portions of first layer 110, core 114, and second layer 112.

Tool 128 may take the form of, for example, without limitation, router 130, laser device 132, or some other type of cutting tool. Using, for example, without limitation, router 130 to cut away a portion of first object 102 to form hollow portion 126 may be easier and require less effort than forming a hole within core 114 alone.

Hollow portion 126 may be formed such that insert 134 may be substantially entirely inserted within hollow portion 126. Insert 134 may then be used to attach second object 104 to first object 102 at edge 106. As depicted, insert 134 may include structure 136, fastener element 138, and cover 140. When insert 134 is positioned with hollow portion 126 of first object 102, fastener element 138 may be exposed at edge 106 and prepared to receive another fastener element.

In these illustrative examples, structure 136 may have outer side 142, inner side 144, first side 146, and second side 148. In particular, structure 136 may have first surface 150 and second surface 152 at first side 146 and second side 148, respectively. Structure 136 may also have edge surface 154 at outer side 142. Edge surface 154 at outer side 142 of structure 136 may be the surface of structure 136 that is exposed at edge 106 of first object 102 when structure 136 is inserted within hollow portion 126.

As depicted, edge surface 154 may have opening 156 that extends through structure 136. Opening 156 may only be located along edge surface 154 in these examples. In other words, opening 156 may not be located along first surface 150 or second surface 152 of structure 136.

Edge surface 154 of structure 136 may be configured to be substantially even with edge 106 of first object 102 when structure 136 is inserted within hollow portion 126. Further, first surface 150 and second surface 152 of structure 136 may be configured to be substantially even with first outer surface 116 and second outer surface 118, respectively, of first object 102 when structure 136 is inserted within hollow portion 126.

In other words, edge surface 154, first surface 150, and second surface 152 may be substantially flush with edge 106 of first object 102 when structure 136 is inserted within hollow portion 126. In these illustrative examples, structure 136 may be shaped such that structure 136, and thereby insert 134 are substantially flush with all portions of first object 102 when insert 134 is positioned within hollow portion 126 of first object 102.

In these illustrative examples, structure 136 may be configured to hold fastener element 138. Fastener element 138 may take any number of forms depending on the implementation. In one illustrative example, fastener element 138 may take the form of a nut having threads configured to receive another threaded fastener element, such as a screw.

As depicted, hollow fastener chamber 158 of structure 136 may be configured to receive and hold fastener element 138. In one illustrative example, hollow fastener chamber 158 may have a first size that is greater than a second size of fastener element 138. As one illustrative example, hollow fastener chamber 158 may have a greater diameter than the diameter of fastener element 138. In this manner, fastener element 138 may be configured to move freely within hollow fastener chamber 158 of structure 136. In one illustrative example, fastener element 138 may be configured to move freely within a plane substantially perpendicular to an axis through fastener element 138. In other words, fastener element 138 may be allowed to "float" within hollow fastener chamber 158.

Additionally, structure 136 may have set of hollow chambers 160. As used herein, a "set of" items may be zero or more items. In this manner, a set of items may be a null or empty set in some cases. In these illustrative examples, set of hollow chambers 160 may include zero, two, four, or some other number of hollow chambers. Set of hollow chambers 160 may be configured to reduce the weight of structure 136.

Once insert 134 has been positioned within hollow portion 126, insert 134 may be adhesively bonded to first object 102. As one illustrative example, structure 136 may have number of grooves 164 at first side 146 of structure 136. When structure 136 is inserted within hollow portion 126 of first object 102, number of grooves 164 may form number of openings 166 at first side 146 of structure 136.

As used herein, a "number of" items may be one or more items. In this manner, number of grooves 164 may include one or more grooves and number of openings 166 may include one or more openings.

Number of openings 166 may open into air pockets that may be around and/or within hollow portion 126 within core 114 around structure 136. Adhesive material 168 may be injected into these air pockets through number of openings 166. Adhesive material 168 may take the form of, for example, without limitation, a potting compound.

In one illustrative example, plate 170 may be positioned such that plate 170 covers at least a portion of first surface 150 of structure 136 and at least a portion of first outer surface 116 of first object 102. In particular, plate 170 may have number of plate openings 172 that correspond to number of openings 166. Plate 170 may be positioned such that number of plate openings 172 may be substantially aligned with number of openings 166.

When adhesive material 168 is injected into number of openings 166, any excess of adhesive material 168 that spills over onto plate 170 without contacting first surface 150 of structure 136 or first outer surface 116 of first object 102. In other words, plate 170 may catch overflow of adhesive material 168 to prevent adhesive material 168 from contacting first outer surface 116 of first object 102.

Plate 170 may be removed and adhesive material 168 may be allowed to harden such that insert 134 is adhesively bonded to first object 102. Once insert 134 is adhesively bonded to first object 102, loads may be transferred between insert 134 and first layer 110 and second layer 112 through adhesive material 168.

In these illustrative examples, fastener element 138 may have channel 161 that extends through fastener element 138. When fastener element 138 is positioned within hollow fastener chamber 158 of structure 136, channel 161 may extend through at least a portion of opening 156 in structure 136. Opening 156 allows channel 161 through fastener element 138 to be exposed at edge 106 of first object 102. In this manner, fastener element 138 may be prepared to receive corresponding fastener element 162 into channel 161 of fastener element 138 through opening 156 in structure 136.

Corresponding fastener element 162 may be another fastener element that is configured for association with second object 104. In one illustrative example, corresponding fastener element 162 may be a screw. Corresponding fastener element 162 may be inserted through opening 156 into channel 161 at edge 106 in a direction that is substantially perpendicular to edge 106. In some cases, corresponding fastener element 162 may be inserted at edge 106 at some other angle relative to edge 106.

When corresponding fastener element 162 is inserted through opening 156 at edge surface 154 of structure 136, at least a portion of corresponding fastener element 162 enters channel 161 of fastener element 138. Insertion of corresponding fastener element 162 into channel 161 may cause fastener element 138 to move freely within hollow fastener chamber 158 of structure 136. In particular, fastener element 138 may move such that channel 161 through fastener element 138 may substantially align with corresponding fastener element 162 within selected tolerances. In this manner, corresponding fastener element 162 may be used to attach second object 104 to first object 102 at edge 106 of structure.

The illustration of manufacturing environment 100 and insert 134 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although insert 134 is depicted with structure 136 holding one fastener element, fastener element 138, structure 136 may be configured to hold more than one fastener element within one or more respective hollow fastener chambers. For example, without limitation, insert 134 may be configured to hold two different types of fastener elements within two different hollow fastener chambers.

Further, although insert 134 is depicted as spanning the entire thickness 124 of first object 102, insert 134 may be configured to span the entire of thickness of two objects that have been stacked on top of each other to form a common edge. For example, without limitation, first object 102 and another object (not shown) may be stacked on top of each other to form a common edge that includes edge 106 and a corresponding edge (not shown) of the other object. Insert 134 may be configured to span the entire thickness of this common edge. In some cases, with this type of configuration, insert 134 may be configured to hold multiple fastener elements that may be installed into these structures. Of course, in some illustrative examples, first object 102 may be comprised of multiple objects; thickness 124 of first object 102 may include the thicknesses of these multiple objects; and edge 106 may be the common edge formed by these multiple objects.

In other illustrative examples, fastener element 138 may not be allowed to move freely within hollow fastener chamber 158. Rather, fastener element 138 and hollow fastener chamber 158 may be sized such that an interference fit is formed when fastener element 138 is placed within hollow fastener chamber 158.

Figure 2:
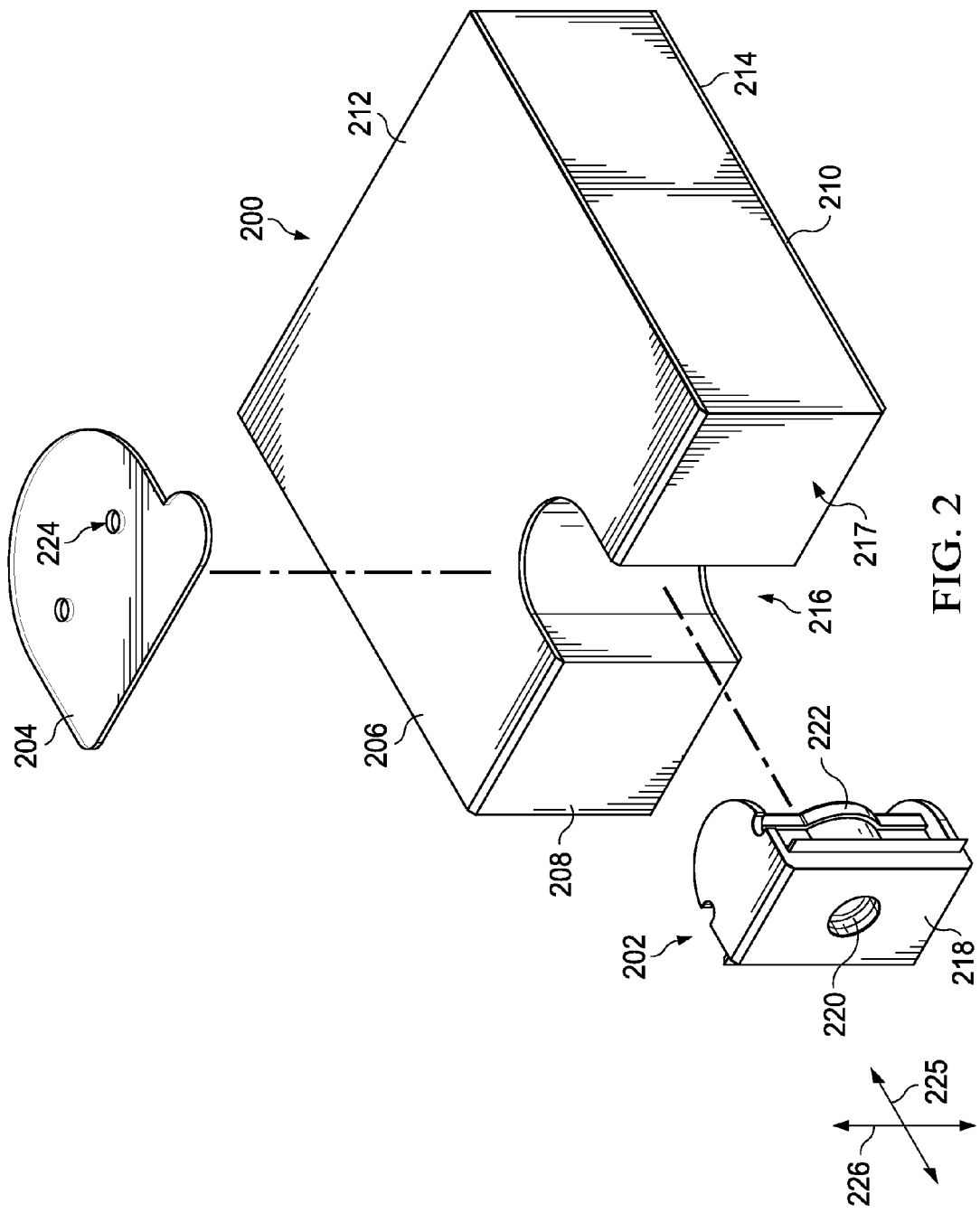
FIG. 2 is an illustration of an isometric view of a composite object, insert, and plate in accordance with an illustrative embodiment.

With reference now to FIG. 2, an illustration of an isometric view of a composite object, insert, and plate is depicted in accordance with an illustrative embodiment. In FIG. 2, composite object 200, insert 202, and plate 204 may be examples of implementations for composite object 108, insert 134, and plate 170, respectively, in FIG. 1.

In this illustrative example, composite object 200 may be comprised of first layer 206, core 208, and second layer 210, which may be examples of implementations for first layer 110, core 114, and second layer 112, respectively, in FIG. 1. As depicted, core 208 is sandwiched between first layer 206 and second layer 210. First layer 206 may form first outer surface 212 of composite object 200, while second layer 210 may form second outer surface 214 of composite object 200. First outer surface 212 and second outer surface 214 may be examples of implementations for first outer surface 116 and second outer surface 118, respectively, in FIG. 1.

Hollow portion 216 may be present within composite object 200 at edge 217 of composite object 200. Hollow portion 216 may be an example of one implementation for hollow portion 126 in FIG. 1. Further, edge 217 may be an example of one implementation for edge 106 in FIG. 1.

In this illustrative example, hollow portion 216 may have been formed using, for example, without limitation, a router (not shown). Insert 202 may be configured to be positioned within hollow portion 216. In particular, insert 202 may be configured such that insert 202 may substantially conform to hollow portion 216.

As depicted, insert 202 may include structure 218, fastener element 220, and cover 222. Structure 218, fastener element 220, and cover 222 may be examples of implementations for structure 136, fastener element 138, and cover 140, respectively, in FIG. 1.

Insert 202 may be positioned within hollow portion 216 and adhesively bonded to composite object 200. In particular, insert 202 may be adhesively bonded to composite object 200 using plate 204 having number of openings 224. Number of openings 224 may be an example of one implementation for number of plate openings 172 in FIG. 1. The process by which insert 202 may be adhesively bonded to composite object 200 is described in FIGS. 7-9.

A second composite object (not shown) may be attached to composite object 200 using insert 202 and a corresponding fastener element (not shown). In particular, the second composite object (not shown) may be attached to edge 217 of composite object 200 by inserting the corresponding fastener element (not shown) into fastener element 220 in a direction substantially parallel to axis 225. Axis 225 is the center axis through fastener element 220 in this example.

In this illustrative example, axis 225 is substantially perpendicular to edge 217 and substantially parallel to first outer surface 212 and second outer surface 214. Axis 226 is substantially perpendicular to axis 225 and to first outer surface 212 and second outer surface 214. In this illustrative example, axis 226 is substantially parallel to edge 217.

Figure 3:
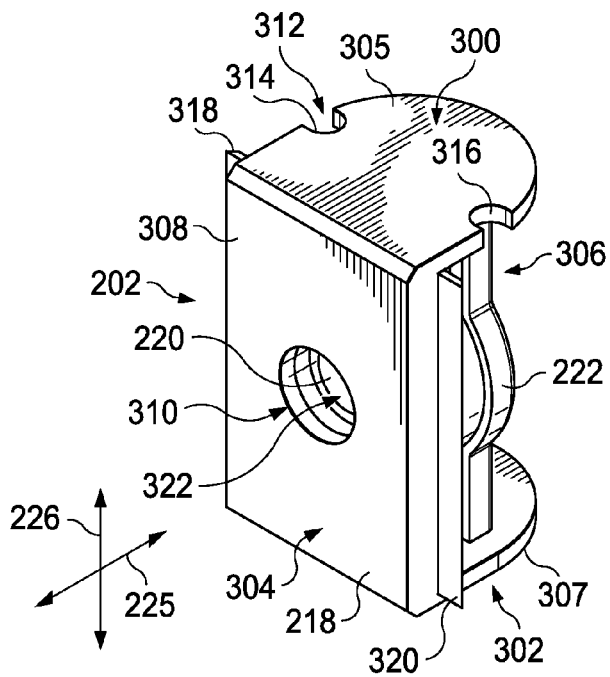
FIG. 3 is an illustration of an enlarged view of an insert in accordance with an illustrative embodiment.

Turning now to FIG. 3, an illustration of an enlarged view of insert 202 from FIG. 2 is depicted in accordance with an illustrative embodiment. As depicted, structure 218 belonging to insert 202 may have first side 300, second side 302, outer side 304, and inner side 306. In particular, structure 218 may have first surface 305 at first side 300, second surface 307 at second side 302, and edge surface 308 at outer side 304. In this illustrative example, opening 310 may be present in edge surface 308 at outer side 304 of structure 218.

Axis 225 through fastener element 220 may be substantially perpendicular to edge surface 308 in this illustrative example. However, in some cases, fastener element 220 may be positioned such that axis 225 through fastener element 220 is at some other angle relative to edge surface 308.

As depicted, structure 218 may have number of grooves 312 at first side 300. Number of grooves 312 may be an example of one implementation for number of grooves 164 in FIG. 1. Number of grooves 312 may include groove 314 and groove 316.

Additionally, in this illustrative example, structure 218 may also include a number of flanges that include flange 318 and flange 320. In some cases, these flanges may also be referred to as tabs. Flange 318 and flange 320 may be flexible at the interface between each of these flanges and structure 218. In other words, flange 318 and flange 320 may be rotated relative to structure 218 at the corresponding interfaces between flange 318 and flange 320.

Flange 318 and flange 320 may be configured to hold the adhesive material used to bond insert 202 to composite object 200 in FIG. 2 within hollow portion 216. In particular, flange 318 and flange 320 may be configured to reduce the flow of adhesive material at outer side 304 of structure 218 such that the adhesive material does not squeeze outside of and around insert 202.

As depicted, fastener element 220 may have channel 322 that extends through fastener element 220. Opening 310 in structure 218 may at least partially overlap with channel 322 in this illustrative example.

Figure 4:
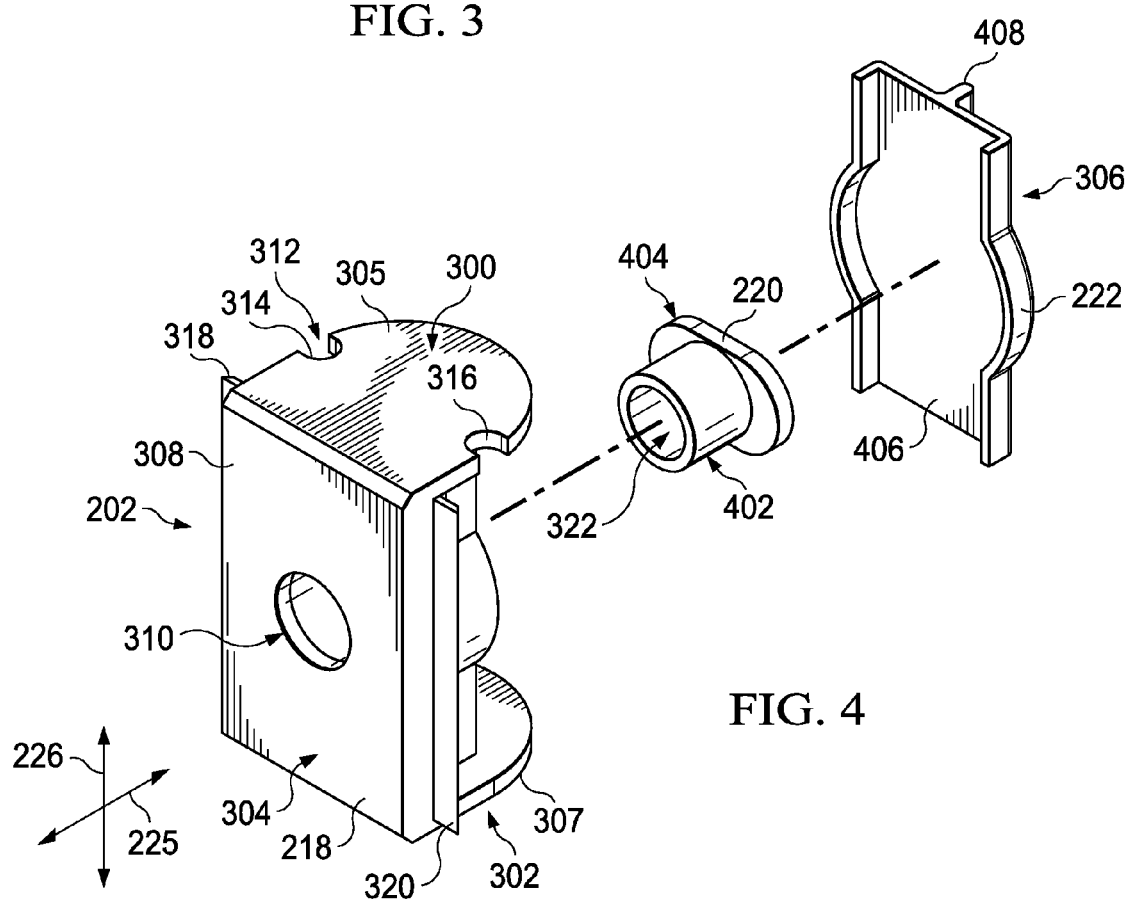
FIG. 4 is an illustration of an exploded isometric view of an insert in accordance with an illustrative embodiment.

With reference now to FIG. 4, an illustration of an exploded isometric view of insert 202 from FIG. 3 is depicted in accordance with an illustrative embodiment. In this illustrative example, fastener element 220 and cover 222 may be more clearly seen. As depicted, fastener element 220 may be comprised of first portion 402 and second portion 404. Channel 322 may extend through both first portion 402 and second portion 404.

Cover 222 may have surface 406 configured to cover fastener element 220. Surface 406 may be substantially planar in this illustrative example. Additionally, cover 222 may have protrusion 408. Protrusion 408 may be configured to protrude into core 208 of composite object 200 from FIG. 2 when insert 202 may be positioned within hollow portion 216 of composite object 200 in FIG. 2.

Figure 5:
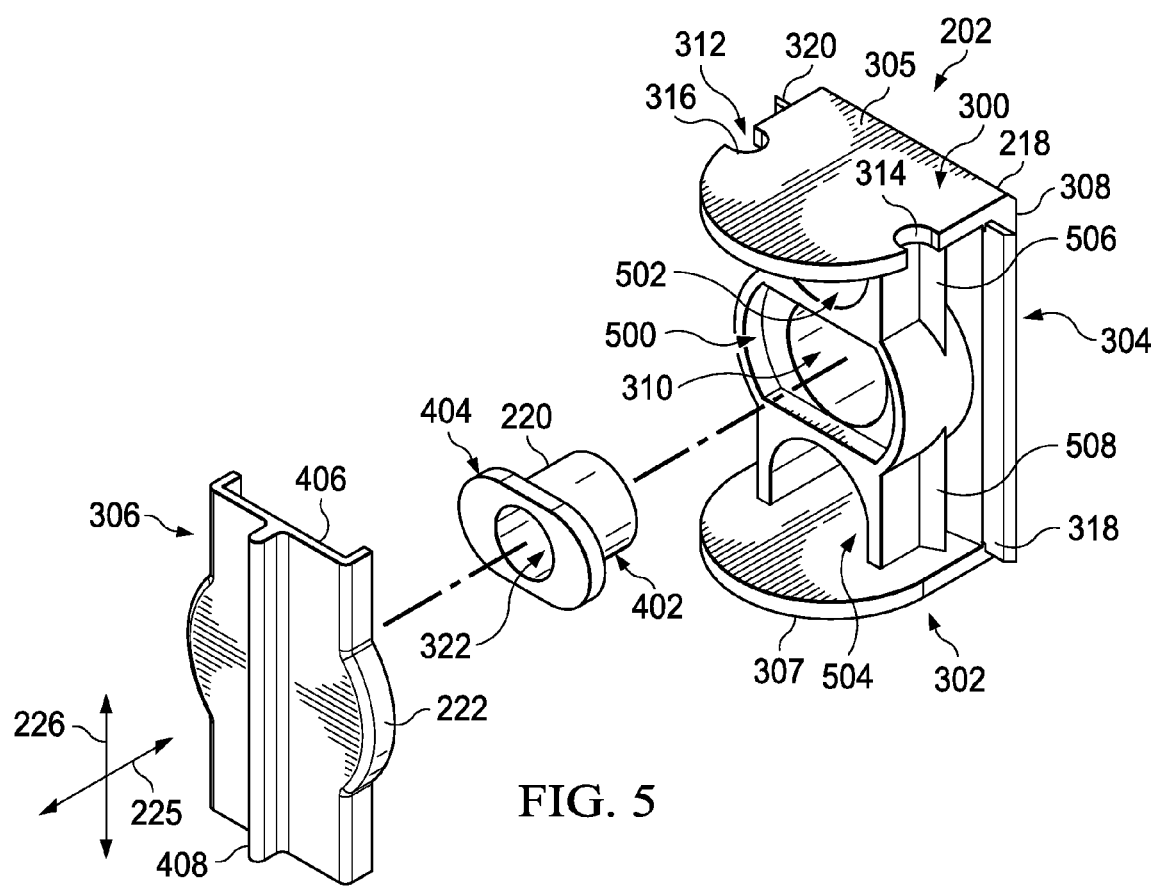
FIG. 5 is an illustration of an exploded isometric view of an insert rotated 180 degrees in accordance with an illustrative embodiment.

With reference now to FIG. 5, an illustration of the exploded isometric view of insert 202 from FIG. 4 rotated about 180 degrees about axis 226 is depicted in accordance with an illustrative embodiment. As depicted in FIG. 5, structure 218 may have hollow fastener chamber 500, hollow chamber 502, and hollow chamber 504. Hollow fastener chamber 500 may be an example of one implementation for hollow fastener chamber 158 in FIG. 1. Hollow fastener chamber 500 may be configured to receive and hold fastener element 220.

Further, hollow chamber 502 and hollow chamber 504 may be examples of implementations for hollow chambers that may be included in set of hollow chambers 160 in FIG. 1. Hollow chamber 502 and hollow chamber 504 may be configured to reduce the weight of structure 218.

Cover 222 may be configured to cover hollow fastener chamber 500, fastener element 220 held within hollow fastener chamber 500, hollow chamber 502, and hollow chamber 504. In this manner, any adhesive material injected into hollow portion 216 in FIG. 2 when insert 202 is positioned within hollow portion 216 may not enter hollow fastener chamber 500, hollow chamber 502, and hollow chamber 504.

Further, structure 218 may have structural feature 506 and structural feature 508. These structural features may aid structure 218 in adhering to composite object 200 within hollow portion 216.

Figure 6:
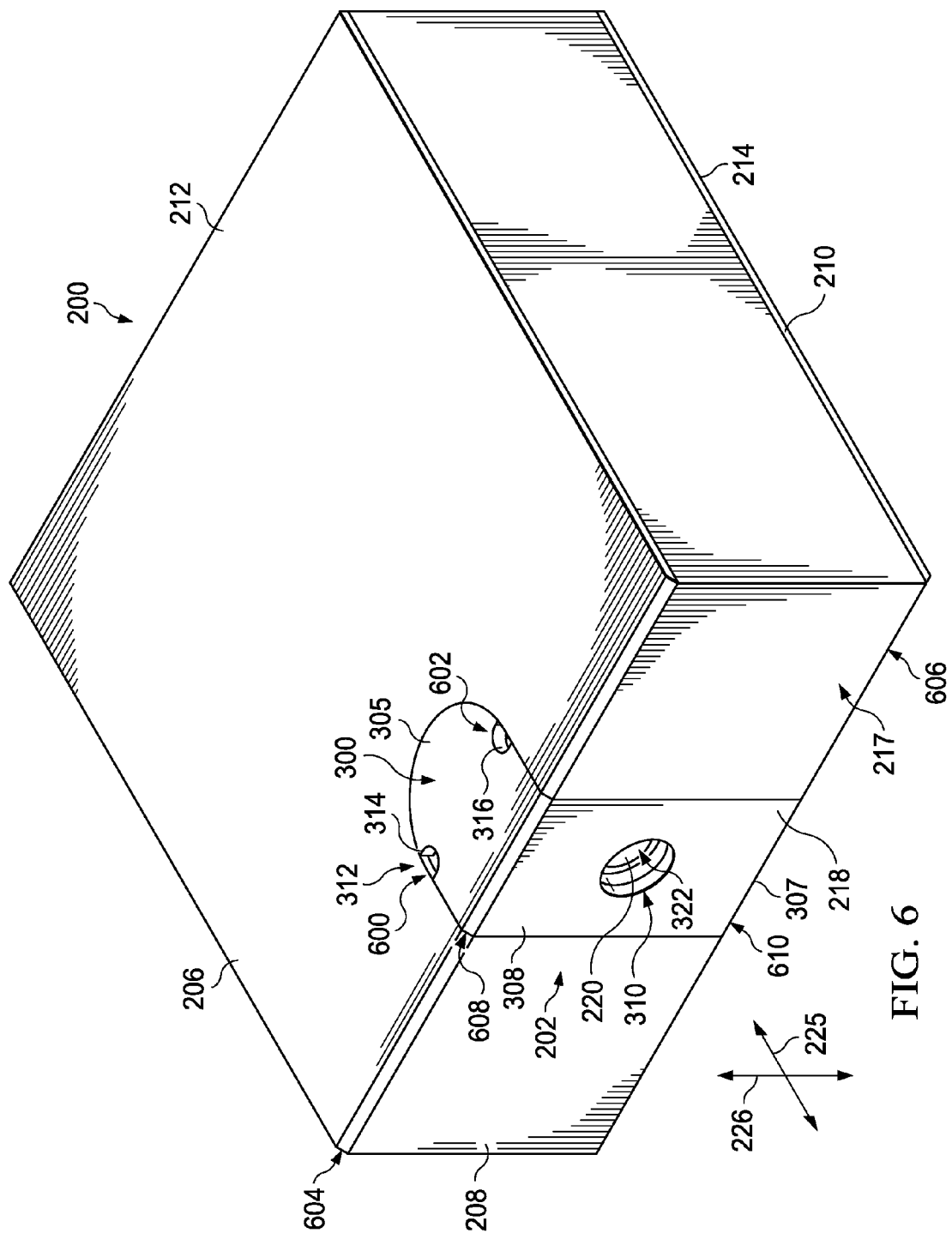
FIG. 6 is an illustration of an insert positioned within a hollow portion in accordance with an illustrative embodiment.

Turning now to FIG. 6, an illustration of insert 202 from FIGS. 2-5 positioned within hollow portion 216 from FIG. 2 is depicted in accordance with an illustrative embodiment. In this illustrative example, insert 202 may have been inserted into hollow portion 216 such that structure 218 substantially conforms to hollow portion 216.

Further, insert 202 may be inserted within hollow portion 216 such that edge surface 308 of structure 218 is substantially even with edge 219 of composite object 200. Additionally, insert 202 may be inserted within hollow portion 216 from FIG. 2 such that first surface 305 and second surface 307 of structure 218 are substantially even with first outer surface 212 and second outer surface 214, respectively, of composite object 200.

As depicted, groove 314 and groove 316 may form opening 600 and opening 602, respectively, into composite object 200 when insert 202 is positioned within hollow portion 216. Opening 600 and opening 602 may extend into core 208 of composite object 200 and, in particular, may extend into any remaining hollow portion of composite object 200 left by hollow portion 216 after insert 202 is inserted within hollow portion 216.

In this illustrative example, edge 217 may have chamfered corner 604 between core 208 and first layer 206 and chamfered corner 606 between core 208 and second layer 210. Structure 218 may have chamfered corner 608 and chamfered corner 610 configured to correspond to chamfered corner 604 and chamfered corner 606, respectively. Chamfered corner 608 and chamfered corner 610 of structure 218 may be configured such that any material such as, for example, without limitation, a trim material, that is wrapped around edge 217 of composite object 200 over a portion of first outer surface 212 and/or second outer surface 214 may lie substantially flush with these outer surfaces.

Figure 7:
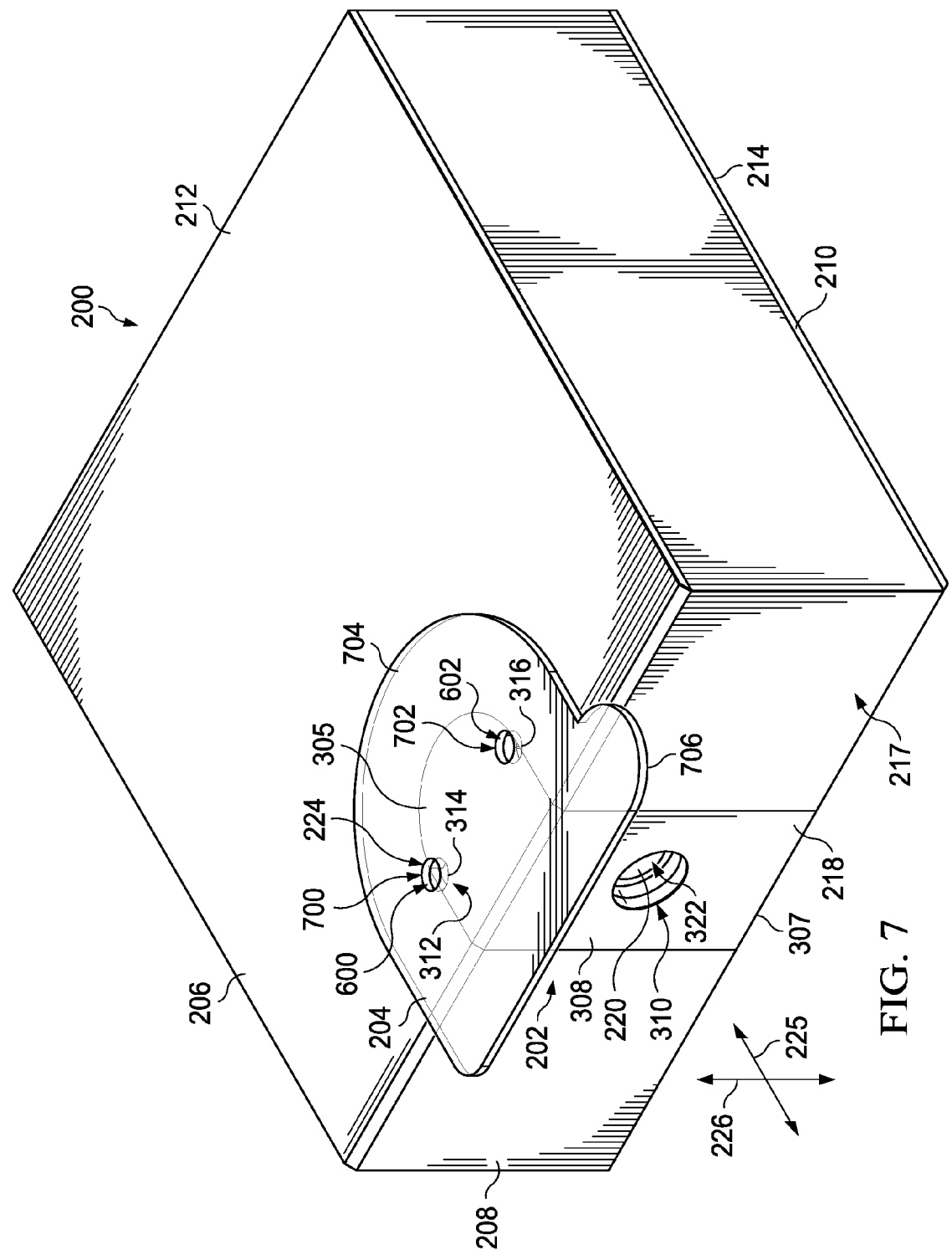
FIG. 7 is an illustration of a plate positioned over an insert and a composite object in accordance with an illustrative embodiment.

With reference now to FIG. 7, an illustration of plate 204 from FIG. 2 positioned over insert 202 and composite object 200 from FIG. 6 is depicted in accordance with an illustrative embodiment. In this illustrative example, number of openings 224 in plate 204 may be an example of one implementation for number of plate openings 172 in FIG. 1.

Number of openings 224 may include opening 700 and opening 702. Opening 700 and opening 702 may correspond to opening 600 and opening 602, respectively, into composite object 200. Plate 204 may be positioned over composite object 200 such that plate 204 overlaps both first surface 305 of structure 218 of insert 202 and first outer surface 212 of composite object 200.

Further, plate 204 may have first surface 704 and second surface 706. Both first surface 704 and second surface 706 may be substantially planar. In this manner, plate 204 may lie substantially flat on top of composite object 200.

Figure 8:
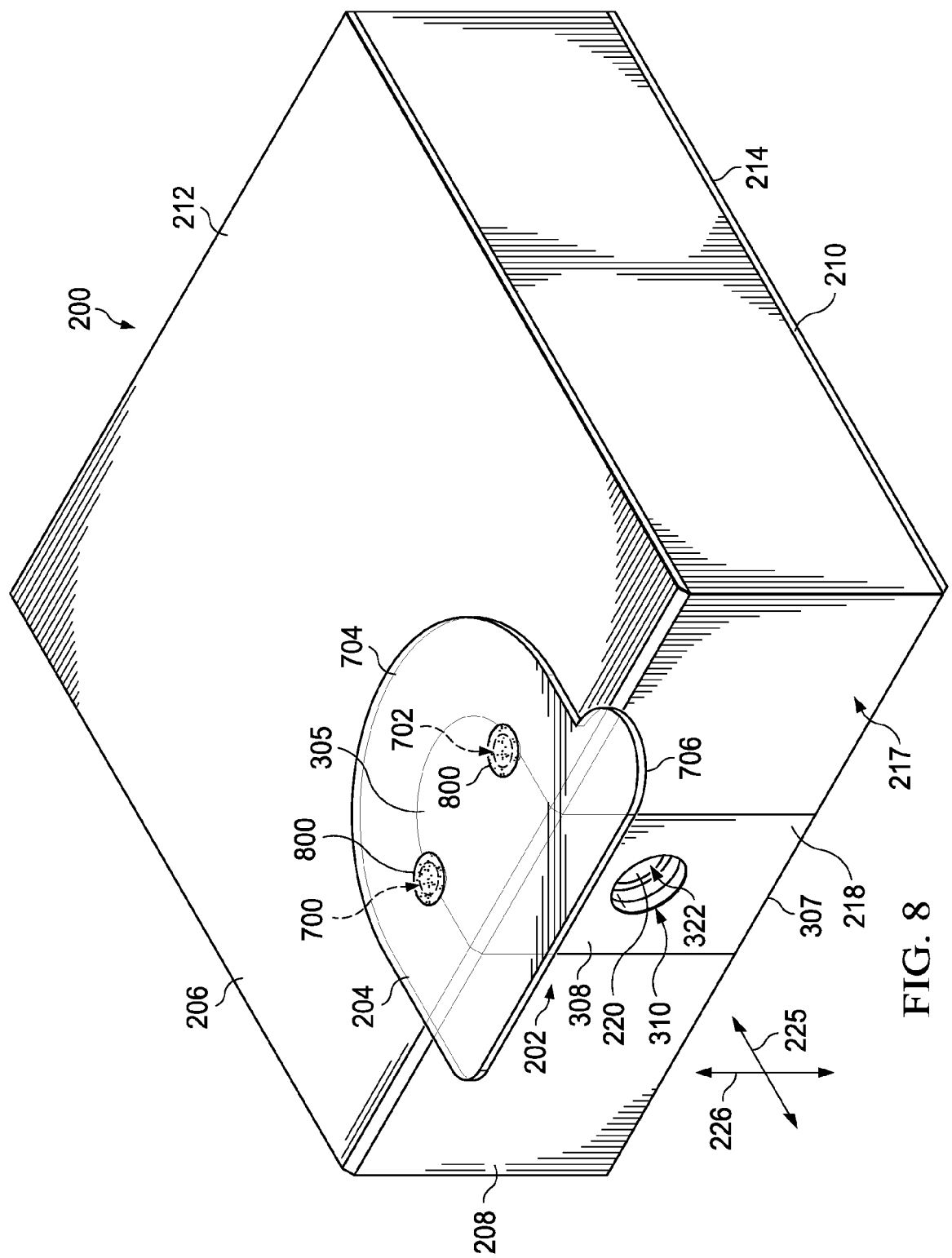
FIG. 8 is an illustration of adhesive material that has been injected into a composite object in accordance with an illustrative embodiment.

Turning now to FIG. 8, an illustration of adhesive material that has been injected into composite object 200 is depicted in accordance with an illustrative embodiment. In this illustrative example, adhesive material 800 may be injected into opening 600 and opening 602 (not shown in this view) into composite object 200 through at least one of opening 700 and opening 702, respectively, in plate 204.

In one illustrative example, adhesive material 800 may be injected into opening 700 until adhesive material 800 squeezes out of opening 702. Flange 318 and flange 320 (not shown in this view) from FIG. 3 may be used to prevent adhesive material 800 from escaping hollow portion 216 at edge 217 of composite object 200 before adhesive material 800 squeezes out of opening 702.

As depicted, any excess of adhesive material 800 may spill over onto plate 204 without contacting first outer surface 212 of composite object 200 or first surface 305 of structure 218. In this manner, plate 204 may protect first outer surface 212 of composite object 200 and first surface 305 of structure 218 and reduce the amount of cleanup needed after insert 202 is bonded to composite object 200.

Figure 9:
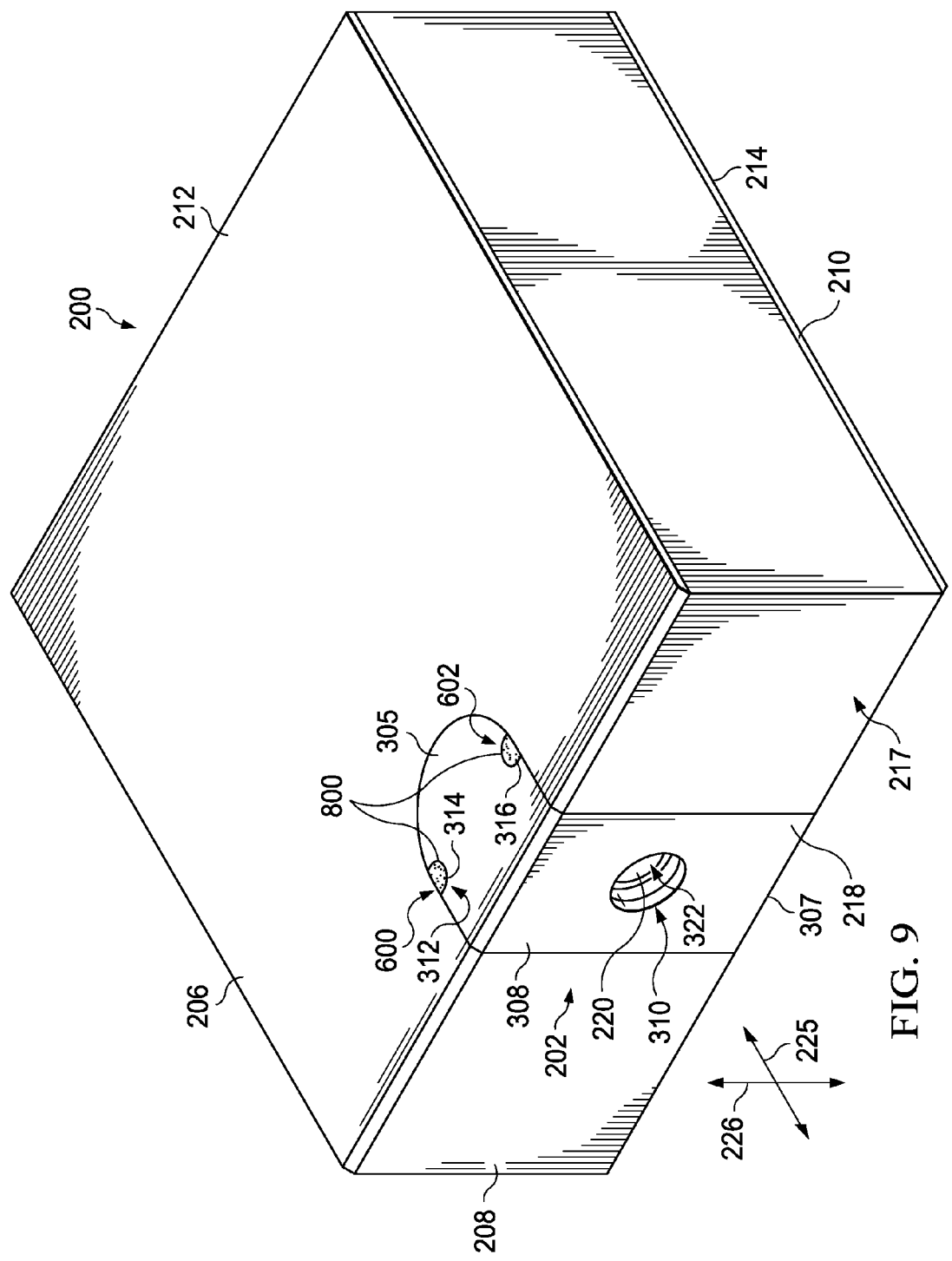
FIG. 9 is an illustration of an insert fully adhesively bonded to a composite object in accordance with an illustrative embodiment.

With reference now to FIG. 9, an illustration of insert 202 fully adhesively bonded to composite object 200 is depicted in accordance with an illustrative embodiment. In this illustrative example, plate 204 has been removed and adhesive material 800 has been allowed to harden.

Once adhesive material 800 hardens, insert 202 may be considered fully adhesively bonded to composite object 200. Another fastener element (not shown), configured for association with another structure (not shown) may be attached to composite object 200 at edge 217 of composite object 200 using insert 202 and, in particular, fastener element 220 held within structure 218 of insert 202.

Figure 10:
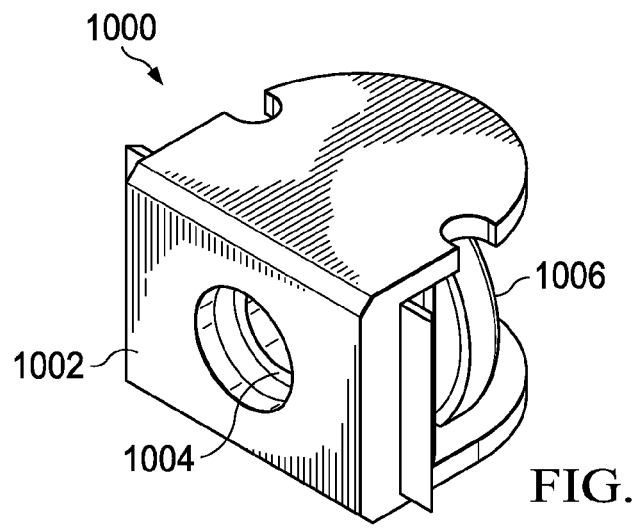
FIG. 10 is an illustration of an isometric view of a different configuration for an insert in accordance with an illustrative embodiment.

Turning now to FIG. 10, an illustration of an isometric view of a different configuration for an insert is depicted in accordance with an illustrative embodiment. In this illustrative example, insert 1000 may be an example of one implementation for insert 134 in FIG. 1. As depicted, insert 1000 may include structure 1002, fastener element 1004, and cover 1006.

Figure 11:
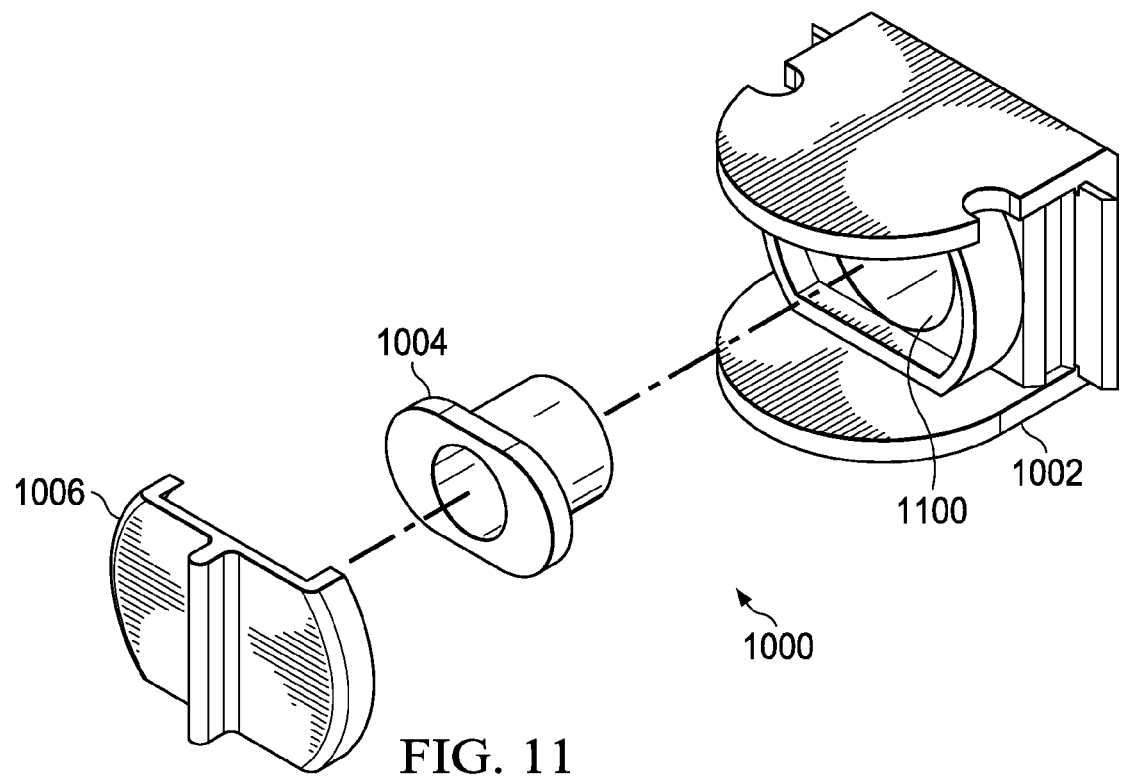
FIG. 11 is an illustration of an exploded isometric view of an insert rotated 180 degrees in accordance with an illustrative embodiment.

With reference now to FIG. 11, an illustration of an exploded isometric view of insert 1000 from FIG. 10 rotated about 180 degrees about axis 226, as seen in FIGS. 2-9, is depicted in accordance with an illustrative embodiment. As depicted, structure 1002 may have hollow fastener chamber 1100. However, no other hollow chambers may be present within structure 1002 in this illustrative example.

Figure 12:
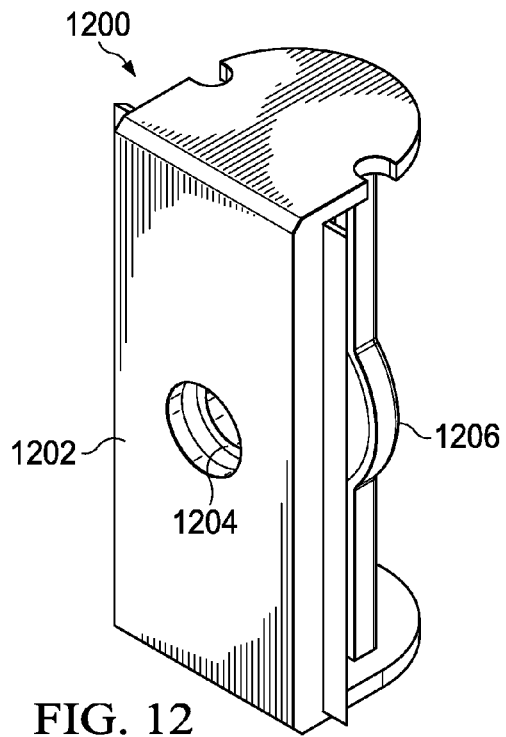
FIG. 12 is an illustration of an isometric view of a different configuration for an insert in accordance with an illustrative embodiment.

Turning now to FIG. 12, an illustration of an isometric view of a different configuration for an insert is depicted in accordance with an illustrative embodiment. In this illustrative example, insert 1200 may be an example of one implementation for insert 134 in FIG. 1. As depicted, insert 1200 may include structure 1202, fastener element 1204, and cover 1206.

Figure 13:
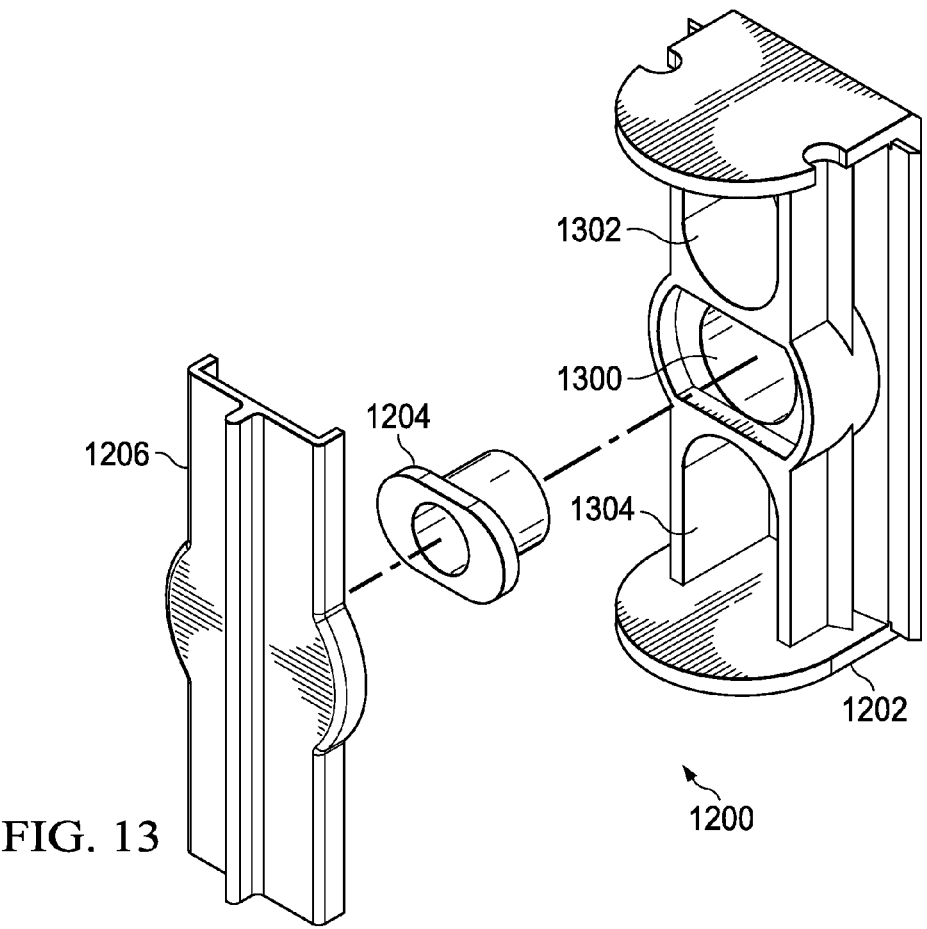
FIG. 13 is an illustration of an exploded isometric view of an insert rotated 180 degrees in accordance with an illustrative embodiment.

With reference now to FIG. 13, an illustration of an exploded isometric view of insert 1200 from FIG. 12 rotated about 180 degrees about axis 226 is depicted in accordance with an illustrative embodiment. In this illustrative example, structure 1202 may be configured to span a composite object (not shown) having a thickness that is greater than the thickness of composite object 200 in FIG. 2.

As depicted, structure 1202 may have hollow fastener chamber 1300. Further, structure 1202 may have hollow chamber 1302 and hollow chamber 1304. Hollow chamber 1302 and hollow chamber 1304 may be longer than hollow chamber 502 and hollow chamber 504 in FIG. 5.

The illustrations of composite object 200 in FIG. 2 and FIGS. 6-9, insert 202 in FIGS. 2-9, insert 1000 in FIGS. 10-11, and insert 1200 in FIGS. 12-13 are not meant to imply physical or architectural limitations to the manner in which an illustrative embodiment may be implemented. Other components in addition to or in place of the ones illustrated may be used. Some components may be optional.

Some of the components in FIGS. 2-13 may be illustrative examples of how components shown in block form in FIG. 1 can be implemented as physical structures. The different components shown in FIGS. 2-13 may be combined with components in FIG. 1, used with components in FIG. 1, or a combination of the two.

With reference now to FIG. 14, an illustration of a process for associating an edge of a first object with a second object in the form of a flowchart is depicted in accordance with an illustrative embodiment. The process illustrated in FIG. 14 may be implemented to, for example, without limitation, associate first object 102 with second object 104 using insert 134 in FIG. 1.

The process begins by assembling the insert (operation 1400). Operation 1400 may be performed by, for example, without limitation, positioning a fastener element within a hollow fastener chamber of a structure and covering the fastener element and the hollow fastener chamber using a cover. The structure, the fastener element, and the cover may together form the insert.

Thereafter, the insert may be positioned within a hollow portion at the edge of the first object such that an edge surface of the structure is substantially even with the edge of the first object (operation 1402). The hollow portion may span a total thickness of the first object. The structure may have a number of grooves configured to form a number of openings in the first object when the structure is inserted into the hollow portion of the structure.

Next, an adhesive material may be injected into the number of openings in the first object formed by the structure to adhesively bond the structure to the first object (operation 1404). The second object may be attached to the edge of the first object using the fastener element held by the structure in the insert (operation 1406), with the process terminating thereafter. In particular, the fastener element may be configured to receive another fastener element that is configured for association with the second object. In operation 1406, the other fastener element may be installed within a channel extending through the fastener element held by the structure in the insert for use in attaching the second object to the first object.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, without limitation, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method in the form of a block diagram is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft in the form of a block diagram is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. Any number of inserts, implemented in a manner similar to insert 134 in FIG. 1, may be used to associate structures with the edges of other structures and, in particular, composite objects. Insert 134 may be configured for use during any one or more of, for example, without limitation, production, component and subassembly manufacturing 1506, system integration 1508, in service 1512, routine maintenance and service 1514, and other stages that may be part of aircraft manufacturing and service method 1500.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15. The use of a number of the different illustrative embodiments may substantially expedite the assembly of and/or reduce the cost of aircraft 1600.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a fastener element residing within a hollow fastener chamber in a structure that comprises:
   an outer side that comprises an edge surface;
   a first side that connects to and extends away, substantially perpendicular, from the outer side via a first chamfered corner, such that the first side comprises:
   a first surface; and
   at least two grooves, such that the first surface comprises a flat surface;
   a second side that connects to and extends away, substantially perpendicular, from the outer side via a second chamfered corner, such that the second side comprises a second surface that comprises a flat imperforate surface;
   an inner side that comprises structural features that connect to and extend between the first side and the second side and to the hollow fastener chamber; and
   a cover, shaped such that the cover conforms around a perimeter of the inner side of the structure, and comprising: a planar surface substantially parallel to the edge surface, and a protrusion that extends from one side, that faces away from the edge surface of the cover, the protrusion being: substantially perpendicular to a central axis of the hollow fastener chamber, and comprising a length of the cover that extends from a surface, nearest the second side, of the first side to a surface, nearest the first side, of the second side, such that with the cover attached to the structure, both the first side and the second side of the structure extend, away from the edge surface, beyond the one side, that faces away from the edge surface, of the cover.

2. The apparatus of claim 1, further comprising:
the hollow fastener chamber configured to receive and hold the fastener element, such that the fastener element comprises: a first portion comprising a circumference that fits within an internal diameter of the hollow fastener chamber, and a second portion that extends beyond the circumference, and fits within an extension around an end of the hollow fastener chamber; and
an adhesive material that fills a space between the first side and the second side such that the adhesive adheres to: the protrusion, the cover, the inner side of the structure, and the structural features configured such that the adhesive, when connected to an object adjacent to the apparatus, transfers loads from the apparatus to the object.

3. The apparatus of claim 2 further comprising:
the cover contacting the fastener element and the hollow fastener chamber of the structure, such that an internal edge of an extension from the planar surface of the cover conforms to an external edge of an extension around the edge of the hollow fastener chamber.

4. The apparatus of claim 3, wherein the structure, the fastener element, and the cover form an insert.

5. The apparatus of claim 2, wherein the hollow fastener chamber of the structure has a first size that is greater than a second size of the fastener element such that the fastener element is allowed to move freely within the hollow fastener chamber of the structure within a plane substantially perpendicular to an axis through the fastener element.

6. The apparatus of claim 1, wherein the structure comprises:
a set of hollow chambers located adjacent to the hollow fastener chamber on diametrically opposing sides of the hollow fastener chamber.

7. The apparatus of claim 1, further comprising:
a plate with a number of openings that align with the at least two grooves.

8. The apparatus of claim 7, further comprising an adhesive material: between the first side and the second side, connected to the hollow fastener chamber, and bonding the cover to the inner side of the structure.

9. The apparatus of claim 1 further comprising:
a number of flanges associated with the structure, each flange in the number of flanges being flexible at an interface between the each flange and the structure, such that each flange comprises a length that extends from a surface, nearest the second side, of the first side to a surface, nearest the first side, of the second side.

10. The apparatus of claim 1, wherein the structure comprises:
the edge surface connected to the first chamfered corner that connects to the first surface and connected to the second chamfered corner that connects to the second surface to form a continuous surface that connects the first surface, the second surface, and the edge surface.

11. The apparatus of claim 10, wherein the edge surface has an opening that allows a channel extending through the fastener element to be at least partially exposed at the edge surface.

12. The apparatus of claim 1, wherein the edge surface comprises a rectangular shape.

13. The apparatus of claim 1, further comprising:
the fastener element configured to receive fastener; and
the cover configured such that if the fastener element pushes the cover off the perimeter of the hollow fastener chamber, a shape and a position, between the first side and the second side, of the cover prevent the fastener element from rotating.

14. An insert configured for use at an edge of an object, the insert comprising:
a fastener element;
a structure that comprises:
an inner side;
an outer side that comprises an edge surface that spans from a first chamfered corner to a second chamfered corner:
a hollow fastener chamber that encircles the fastener element such that the fastener element remains accessible through an opening in the edge surface;
a first side that connects to and extends away, substantially perpendicular, from the outer side via the first chamfered corner, such that the first side comprises:
a first surface; and
at least two grooves, such that the first surface comprises a flat surface;
a second side that that connects to and extends away, substantially perpendicular, from the outer side via the second chamfered corner, such that the second side comprises a second surface that comprises a flat imperforate surface;
a flange that extends from a surface, nearest the second side, of the first side to a surface, nearest the first side, of the second side;
a first structural feature connected to the first side, and a second structural feature connected to the second side, each structural feature being substantially parallel to the edge surface and connected to a circumference of the hollow fastener chamber;
a set of hollow chambers adjacent to the hollow fastener chamber on diametrically opposing sides of the hollow fastener chamber;
a cover, shaped such that the cover conforms around a perimeter of the inner side of the structure: a planar surface substantially parallel to the edge surface of the structure, and a protrusion that extends from one side, that faces away from the edge surface, of the cover, the protrusion being: substantially perpendicular to a central axis of the hollow fastener chamber of the structure, and comprising a length of the cover that extends from a surface, nearest the second side, of the first side to a surface, nearest the first side, of the second side, such that with the cover attached to the structure, both the first side and the second side of the structure extend, away from the edge surface, beyond the one side, that faces away from the edge surface, of the cover.

15. The apparatus of claim 1, further comprising:
the first side and the second side configured such that the apparatus inserts, into an edge of a planar object, along an axis substantially perpendicular to a planar surface of the planar object.

16. The insert of claim 14, further comprising an adhesive material that fills a space between the first side and the second side such that the adhesive material adheres to: the protrusion, the cover, the inner side of the structure, and the structural features configured such that the adhesive, when connected to the object, transfers loads from the insert to the object.

17. The insert of claim 14, further comprising the edge surface comprising a rectangular shape.

18. The insert of claim 14, further comprising:
the first side and the second side configured such that the structure inserts, into an edge of a planar object, along an axis substantially perpendicular to a planar surface of the planar object.

19. The insert of claim 14, further comprising a plate, such that the plate comprises a number of openings that align with the at least two grooves in the first side.

* * * * *